US007867597B2

(12) United States Patent
Feigin et al.

(10) Patent No.: US 7,867,597 B2
(45) **Date of Patent: *Jan. 11, 2011**

(54) CONSTRUCTION BOARD WITH CARBONATE

(75) Inventors: Michael E. Feigin, The Woodlands, TX (US); John Wayne Wisenbaker, Jr., Kingwood, TX (US); James Allen Wambaugh, Cypress, TX (US)

(73) Assignee: Jet Products, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/838,060

(22) Filed: Aug. 13, 2007

(65) Prior Publication Data

US 2007/0292653 A1 Dec. 20, 2007

Related U.S. Application Data

(63) Continuation of application No. 11/047,497, filed on Jan. 31, 2005, now Pat. No. 7,255,907.

(51) Int. Cl.
*B32B 13/02* (2006.01)
*B32B 13/04* (2006.01)

(52) U.S. Cl. ........................................ 428/70; 428/703

(58) Field of Classification Search ....................... None
See application file for complete search history.

(56) References Cited

U.S. PATENT DOCUMENTS 53,092 A 3/1866 Sorel
100,945 A 3/1870 Sorel
1,372,118 A 3/1921 Collier
1,386,914 A 8/1921 Tufts
1,500,207 A 7/1924 Shaw
1,965,538 A 7/1934 Stewart (Continued)

FOREIGN PATENT DOCUMENTS

CN 1262171 8/2000

(Continued)

OTHER PUBLICATIONS

Office Action mailed Dec. 15, 2005, by the USPTO, regarding U.S. Appl. No. 11/047,497.

(Continued)

*Primary Examiner*—Timothy M Speer
(74) *Attorney, Agent, or Firm*—Haynes and Boone, LLP

(57) ABSTRACT

A construction board is formed from a composition comprising one or more of the following ingredients: magnesium oxide, magnesium chloride, a binding agent (e.g., perlite), wood shavings, recycled board scraps, and water. The construction board further includes fiberglass and polyester paper sheets on opposite sides of the construction board. A method of fabricating the construction board is also disclosed to include mixing magnesium chloride with water to form a solution, mixing the solution with magnesium oxide, perlite and a binding agent to form a paste, and pouring the paste onto a mold to form a construction board. The paste is poured onto a mold which is then passed through a series of rollers to spread out the paste evenly across the mold and to form the paste into the desired thickness. The resulting construction board is fire and water resistant and much more durable than conventional Sheetrock® brand plaster wallboard.

10 Claims, 4 Drawing Sheets

10
24
22
20
22
24

U.S. PATENT DOCUMENTS 2,205,735 A 6/1940 Scherer, Jr.
2,450,258 A * 9/1948 Skolnik ..................... 106/649
2,462,030 A * 2/1949 Whitehead ................. 106/688
2,543,959 A 3/1951 Eastin
2,598,980 A 6/1952 Denning
2,598,981 A 6/1952 Denning
2,717,841 A 9/1955 Biefeld et al.
2,724,655 A 11/1955 Williams
2,858,227 A 10/1958 Rodsky
2,999,759 A 9/1961 Heuer
3,050,427 A 8/1962 Slayter et al.
3,130,174 A 4/1964 Lloyd et al.
3,133,830 A 5/1964 Jochinke
3,147,177 A 9/1964 Owens et al.
3,211,675 A 10/1965 Johnson
3,223,576 A 12/1965 Evans et al.
3,238,155 A 3/1966 Harrell et al.
3,317,442 A 5/1967 Clarke
3,354,099 A 11/1967 Stegeman
3,502,610 A 3/1970 Thompson
3,573,941 A 4/1971 Edwards et al.
3,607,797 A 9/1971 Rubens et al.
3,667,978 A 6/1972 Vassilevsky et al.
3,719,512 A 3/1973 Danielis
3,751,275 A 8/1973 Oken
3,763,070 A 10/1973 Shearing
3,778,304 A * 12/1973 Thompson ................. 427/243
3,969,453 A * 7/1976 Thompson .................. 264/42
4,448,639 A 5/1984 Long
4,613,627 A 9/1986 Sherman et al.
4,624,417 A 11/1986 Gangi
4,673,697 A 6/1987 Rowley
4,872,912 A 10/1989 Barrall et al.
5,039,454 A 8/1991 Policastro et al.
5,049,197 A 9/1991 Brown
5,130,184 A 7/1992 Ellis
5,213,161 A * 5/1993 King et al. ................. 166/293
5,256,222 A 10/1993 Shepherd et al.
5,264,057 A 11/1993 Schlatter et al.
5,766,337 A 6/1998 Moon
6,054,088 A 4/2000 Alhamad
6,319,312 B1 11/2001 Luongo
6,319,579 B1 11/2001 Strandgaard
6,663,979 B2 12/2003 Deodhar et al.
6,773,794 B2 8/2004 Lindner
7,211,318 B2 5/2007 Lee et al.
7,255,907 B2 8/2007 Feigin et al.
2005/0103235 A1 5/2005 Harrison
2005/0252419 A1 11/2005 Mabey
2006/0070321 A1 4/2006 Au
2007/0267120 A1 11/2007 Feigin et al.
2008/0314296 A1 12/2008 Wisenbaker et al.
2009/0011279 A1 1/2009 Wisenbaker et al.
2009/0011670 A1 1/2009 Wisenbaker
2009/0025850 A1 1/2009 Feigin et al.
2009/0065972 A1 3/2009 Feigin et al.
2009/0223618 A1 9/2009 Smith

FOREIGN PATENT DOCUMENTS

CN 1415574 5/2003
CN 1450017 10/2003
CN 1456528 11/2003
EA 0001799 8/2001
EP 0475302 3/1992
GB 1188140 4/1970
JP 58029648 2/1983
JP 04292449 10/1992
JP 10279344 10/1998
WO WO 94/05737 9/1994
WO WO 98/37032 8/1998

OTHER PUBLICATIONS

Final Office Action mailed Jun. 19, 2006, by the USPTO, regarding U.S. Appl. No. 11/047,497.
Office Action mailed Aug. 22, 2006, by the USPTO, regarding U.S. Appl. No. 11/047,497.
Final Office Action mailed Dec. 13, 2006, by the USPTO, regarding U.S. Appl. No. 11/047,497.
Examiner's Interview Summary mailed Jan. 18, 2007, by USPTO, regarding U.S. Appl. No. 11/047,497.
Advisory Action mailed Jan. 30, 2007, by the USPTO, regarding U.S. Appl. No. 11/047,497.
Examiner's Interview Summary mailed Mar. 14, 2007, by the USPTO, regarding U.S. Appl. No. 11/047,497.
Notice of Allowance mailed Apr. 25, 2007, by the USPTO, regarding U.S. Appl. No. 11/047,497.
Office Action mailed Jun. 25, 2009, by the USPTO, regarding U.S. Appl. No. 11/772,987.
Office Action mailed Jun. 24, 2009, by the USPTO, regarding U.S. Appl. No. 12/187,724.
New Riverside Dictionary, The Riverside Publishing Company, p. 185 (1994).
Office Action mailed Dec. 16, 2009, by the USPTO, regarding U.S. Appl. No. 12/235,257.
Office Action mailed Dec. 29, 2009, by the USPTO, regarding U.S. Appl. No. 12/187,700.
Office Action mailed Jan. 7, 2010, by the USPTO, regarding U.S. Appl. No. 11/772,987.
Office Action mailed Mar. 19, 2010, by the USPTO regarding U.S. Appl. No. 12/187,724.
Office Action mailed Apr. 12, 2010, by the USPTO regarding U.S. Appl. No. 12/196,987.
Office Action mailed Jun. 16, 2010, by the USPTO, regarding U.S. Appl. No. 11/772,987.
Office Action mailed Jun. 17, 2010, by the USPTO, regarding U.S. Appl. No. 12/187,700.

* cited by examiner

CONSTRUCTION BOARD WITH CARBONATE

CROSS REFERENCE TO RELATED APPLICATIONS

This application is a continuation of application Ser. No. 11/047,497 filed Jan. 31, 2005, the entire disclosure of which is incorporated herein by reference.

BACKGROUND

Homes and other types of structures are fabricated from a variety of materials. Typical materials include, for example, gypsum wallboard and silicate-based products. Conventional gypsum wallboard, while generally satisfactory for its intended use, unfortunately can be easily permanently damaged from water, fire, or blunt force (e.g., a chair knocking into the wall). Also, it has been reported that products that contain silicate in some situations may be harmful to humans. Accordingly, special precautions must be taken to minimize the harmful effects to construction workers that work with silicate-based products.

SUMMARY

In accordance with a preferred embodiment of the invention, a construction board is formed from a composition comprising one or more of the following ingredients: magnesium oxide, magnesium chloride, a binding agent (e.g., wood shavings), perlite, recycled board scraps, and water. The construction board also includes fiberglass and polypropylene sheets on opposite sides of the construction board.

A method of fabricating the construction board is also disclosed herein. The disclosed method comprises mixing magnesium chloride with water to form a solution, mixing the solution with magnesium oxide, perlite and a binding agent to form a paste, and pouring the paste onto a mold to form the construction board. The paste is poured onto a mold and the mold is passed through a series of rollers to spread out the paste evenly across the mold and to form the paste into the desired thickness. The method may also include incorporating fiberglass and or polyester paper sheets into the board.

The construction board may be used in a variety of applications such as interior wall board, structural sheathing, soffit board, exterior siding, fascia board, tile backer board, decking for countertops, radiant barrier sheathing, structural wrap, stucco wrap, window wrap, ceiling tile, and billboard backer. The resulting construction board advantageously is generally fire resistant, water resistant, and more durable than conventional gypsum wallboard and other types of building materials. Further, because no, or substantially no, silicate is used in the construction board, the potentially harmful effects of silicate-based products are avoided.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular components. As one skilled in the art will appreciate, companies may refer to a component by different names. This document does not intend to distinguish between components that differ in name but not function. Further, in the following discussion and in the claims, the terms "including" and "comprising" are used in an open-ended fashion, and thus should be interpreted to mean "including, but not limited to . . . " All numerical values in this disclosures are exact or approximate. Accordingly, various embodiments of the invention may deviate from the exact numbers disclosed herein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment and not intended to intimate that the scope of the disclosure, including the claims, is limited to that embodiment.

Figure 1:
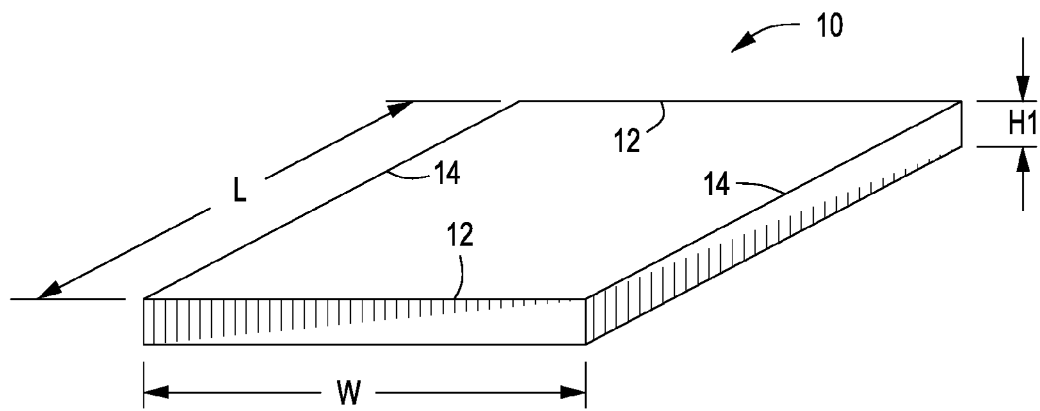
FIG. 1 shows a perspective view of a construction board fabricated in accordance with the preferred embodiment of the invention.

FIG. 1 shows a construction board 10 fabricated in accordance with a preferred embodiment of the invention. The construction board 10 is made from a composition comprising one or more of the following ingredients: magnesium oxide, magnesium chloride, a binding agent (e.g., wood shavings), perlite, recycled board scraps, and water. In one embodiment, for example, the construction board comprises a combination of magnesium oxide, magnesium chloride, water, perlite, and a binding agent. In another exemplary embodiment, the construction board comprises magnesium oxide, magnesium chloride, water, perlite, a binding agent and ground up, construction board scraps. Exemplary amounts of the various ingredients are provided below.

The construction board 10 can be used in a variety of ways during the fabrication of a structure such as a house or other type of building. Without limitation, such uses include interior wall board, structural sheathing, soffit board, exterior siding, fascia board, tile backer board, decking for countertops, radiant barrier sheathing, structural wrap, stucco wrap, window wrap, ceiling tile, and billboard backer. Because of the ingredients comprising the construction board 10, the resulting board is generally fire and water-resistant and substantially more durable than conventional gypsum wall board. Further, in at least some embodiments, the construction board 10 is free of, or at least substantially free of, any combination, or all, of the following: silicate (including magnesium silicate), natron, and cement. Without silicate, the preferred embodiment of the construction board does not have the potential for human harm attributable to silicate-based products.

By way of definition, the construction board 10 depicted in FIG. 1 has a length L, width W, and height H1. The dimensions L, W, and H1 can be varied to suit any particular needs. In at least one embodiment, L, W, and H1 are approximately 8 feet 4 feet, and one-half inch, respectively.

Figure 2:
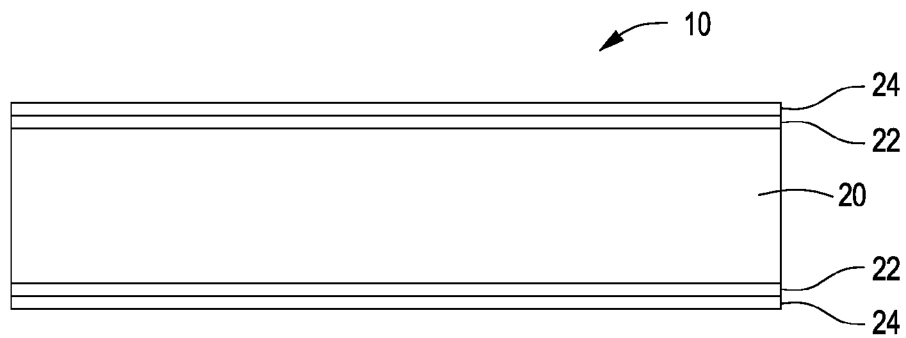
FIG. 2 shows a cross-sectional view of the construction board of FIG. 1.

FIG. 2 shows a cross-sectional view of the construction board 10. As shown, the board comprises a center portion 20 which generally comprises the composition of the various ingredients as described below. A pair of fiberglass sheets 22 is also included on opposite sides of the board 10. Further still, a pair of polyester paper sheets 24 is also included adjacent the fiberglass sheets 22. In at least some embodiments, the fiberglass sheets 22 may be sufficiently porous to permit some of the composition 20 to permeate the fiberglass sheets.

Figure 3:
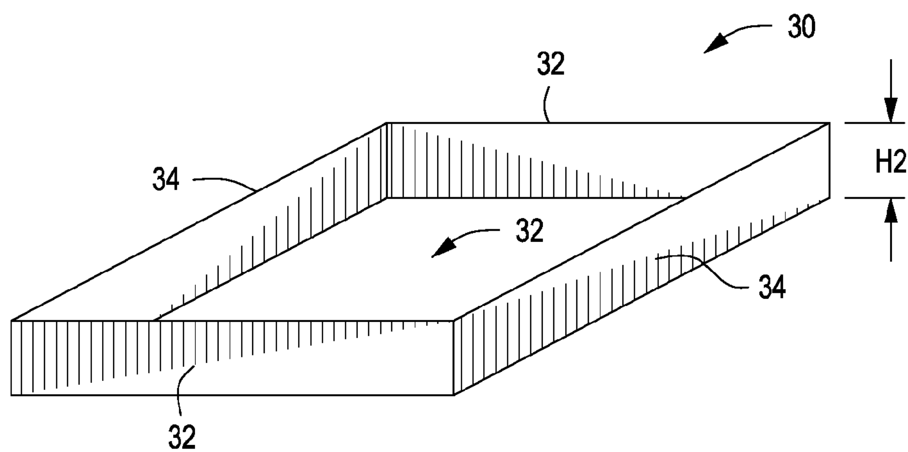
FIG. 3 shows a perspective view of a mold used in the fabrication of the construction board.
Figure 4:
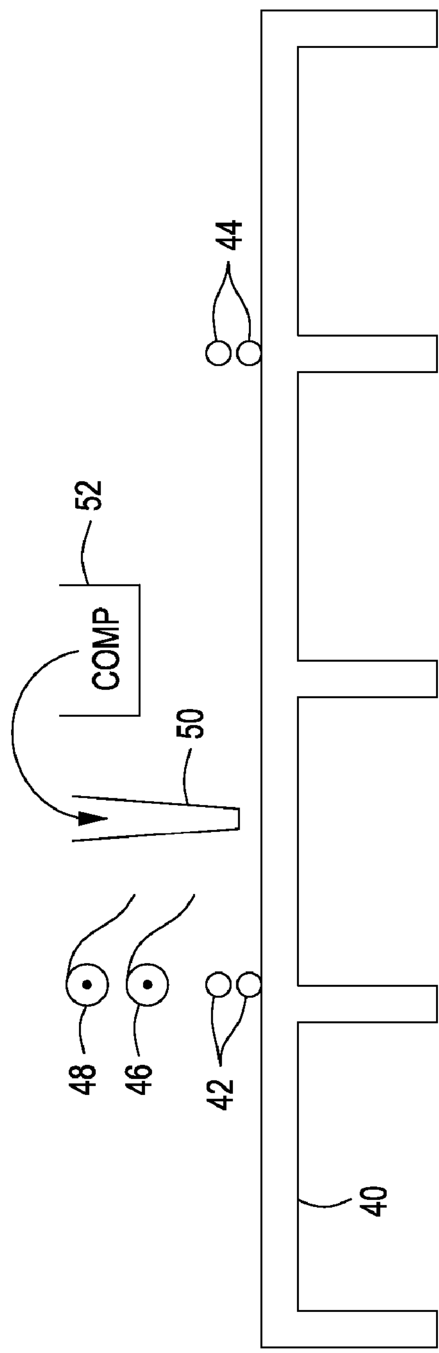
FIG. 4 shows a fabrication station at which one or more of the construction boards can be fabricated.

The following discussion describes a preferred method for fabricating the construction board 10. FIGS. 3 and 4 depict at least some of the equipment used to fabricate the construction board 10. FIG. 3 illustrates a mold 30 that is used. The mold may comprise a plastic (or other suitable material) flat sheet and, in some embodiments, may have lips while in other embodiments not have lips. The lips function to help define the thickness of the board. When mixed together, the constituent ingredients form a mixture that is viscous enough so that, in some embodiments, the lips are not needed—the mixture can be formed to any suitable thickness without the use of lips on the mold. As shown in FIG. 3, the mold has a base 32 and lips 32 and 34 that protrude up from the base 32. The length and width dimensions of the mold 30 approximate the desired dimensions of the construction board 10. The height H2 of the mold, however, may be less than the desired height H1 of the construction board.

FIG. 4 shows a production line table 40 usable to fabricate the construction board 10. The table 40 preferably is of a length longer than the desired length of the construction board. Two pairs of rollers 42 and 44 are also included between which the mold will pass as will be described below. Rolls 46 and 48 contain fiberglass and polypropylene, respectively, which are used during the fabrication of the board. The mold 30 is passed along the table 40 between the rollers as described herein. Spout 50 receives the composition from a mixing chamber 52. Through the spout 50, the composition can be poured onto the mold 30 as it passes along table 40.

In some embodiments, boards are made using ground up excess portions (e.g., scraps) from prior fabrication processes of construction boards. That is, as the boards are cut to size, the left-over scraps are ground up and reused to make future boards. In other embodiments, recycled board scraps are not used. In a preferred embodiment, the construction board 10 comprises the ingredients listed below in Table 1. The kilogram values represent sufficient materials to fabricate four boards that are each approximately 4 feet wide by 8 feet long by 12 millimeters (mm) thick. The relative proportions (in "parts") are also provided. The column labeled "without recycling" refers to the ingredients used to make the boards without reusing left-over board scraps from prior fabrication processes. The column labeled "with recycling" refers to the ingredients used to make the boards while reusing left-over board scraps from prior fabrication processes.

TABLE 1

| INGREDIENTS | Without recycling | | With Recycling | |
|---|---|---|---|---|
| | Parts by weight | Amount (Kg) | Parts by weight | Amount (Kg) |
| Magnesium oxide | 7 | 105 | 10 | 100 |
| Magnesium chloride and water mixture | 3 | 45 | 4 | 40 |
| Perlite | 1.67 | 25 | 2 | 20 |
| Binding agent | 1 | 15 | 1 | 10 |
| Recycled board scraps | N/A | N/A | 2 | 20 |

The magnesium oxide, magnesium chloride and perlite ingredients are generally initially in powder form. In at least some embodiments, the magnesium oxide that is used may comprise, by weight, 89.1% magnesium, 5.3% silicon, 3.9% calcium, 1% iron, 0.2% chloride, 0.2% sulfur, 0.2% cobalt, and 0.1% gallium. Preferably, the size of the magnesium oxide particles used to make the construction board are in the range from approximately 1 μm to approximately 50 μm. The magnesium chloride preferably comprises, by weight, 64.5% chloride, 23.2% magnesium, 8% sodium, 2.4% sulfur, 1.2% potassium, 0.3% bromine, 0.2% aluminum, 0.1% iron, and 0.1% calcium. Preferably, the size of the magnesium chloride particles used to make the construction board are in the range from approximately 0.5 μm to approximately 3 μm. The perlite preferably comprises, by volume, 64% silicon, 14.2% potassium, 10.9% aluminum, 3.8% sodium, 3.2% iron, 2.5% calcium, 0.5% arsenic, 0.3% titanium, 0.3% manganese, 0.1% rubidium, and 0.1% zirconium. Preferably, the size of the perlite particles used to make the construction board are in the range from approximately 2 μm to approximately 6 μm. The binding agent functions to bind the composition together and may comprise wood shavings although binding agents other than wood shavings may be used in this regard as desired.

Figure 5:
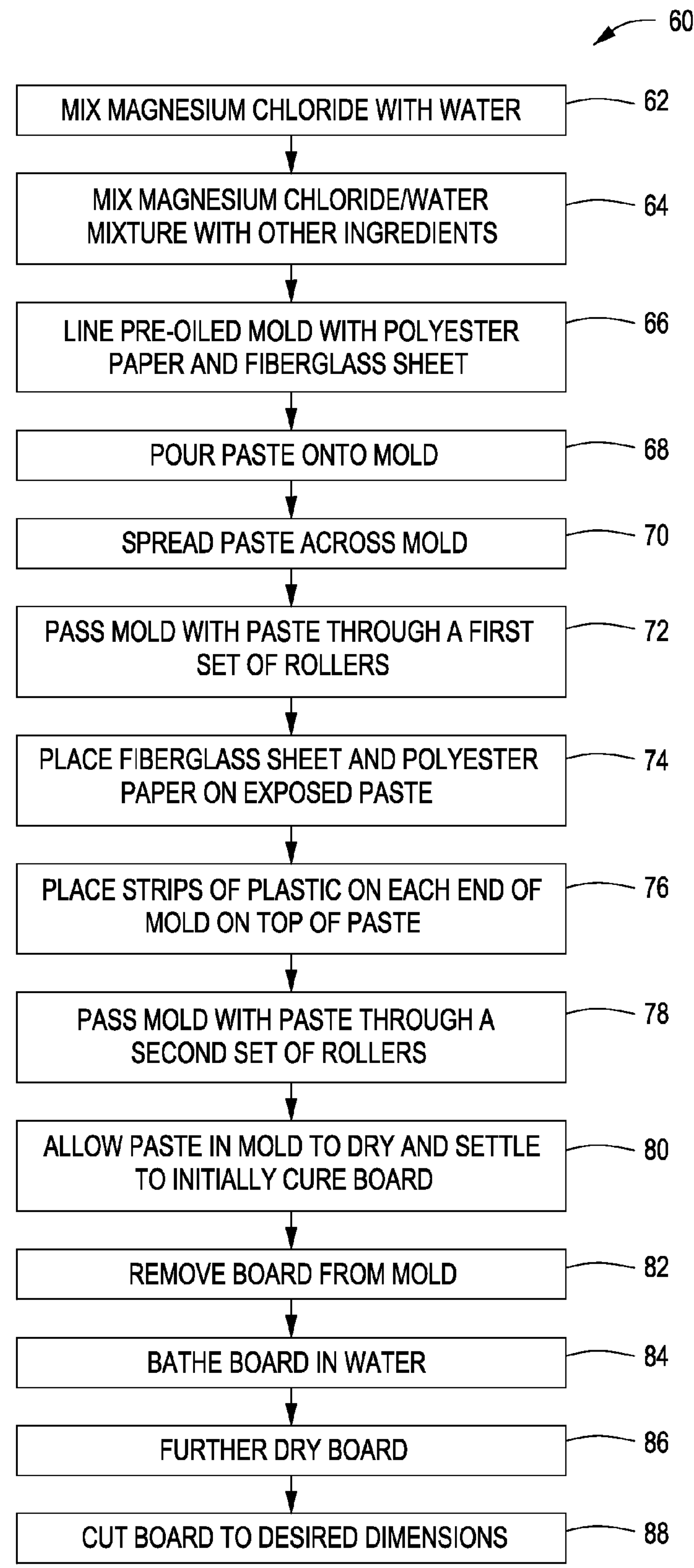
FIG. 5 shows a preferred method of fabricating the construction board.

FIG. 5 illustrates a method 60 for fabricating the construction board 10 in accordance with a preferred embodiment of the invention. Method 60 includes a plurality of actions 62-88, which will be described below. The order of least some of the actions of method 60 can be varied from that shown and at least some of the actions may be performed sequentially or concurrently. The amounts of each ingredient described in FIG. 5 is in accordance with the amounts in Table 1 and depends on whether recycled ground up board scraps are used.

At 62, the method includes mixing magnesium chloride with water in a mixing chamber (which may be different from mixing chamber 52 in FIG. 4) to form a solution. Tap water may be used. For every 10 kg of magnesium chloride, approximately 0.9 cubic meters of water is used to form the solution. The magnesium chloride and water solution is stirred periodically over a period of time, such as 8 hours, to let any impurities rise to the surface. Such impurities preferably are removed.

At 64, the magnesium chloride/water solution is mixed in mixing chamber 52 with the remaining ingredients listed in Table 1, which may or may not include recycled board material as noted above, to form a paste. If wood shavings are used as the binding agent, the wood shavings preferably are filtered through a sieve to trap large pieces of wood and other nontimber impurities. The resulting paste is mixed for enough time (e.g., a few minutes) until the mixture achieves a cake mix-like consistency.

Action 66 comprises lining a pre-oiled mold (e.g., mold 30) with a polyester paper sheet and a fiberglass sheet on top of the polyester paper. This action can be performed by placing the pre-oiled mold 30 on table 40 and unrolling a suitable length of each of rolls 46 and 48 on to the mold. The mold 30 may be pre-oiled with any suitable oil or other material that reduces the propensity for the composition to stick to the mold. An example of a suitable oil for this purpose comprises 1 part engine oil to 10 parts water.

After the paste has settled in the mixing chamber 52, the paste is then poured onto the mold (action 68). The paste will be relatively thick and will thus remain in a pile on the mold 30 to a height that may be greater than the height H2 of the mold. At 70, the paste is spread across the mold 30 in accordance with any suitable technique such as by using a wooden or plastic board to push the paste around to spread it out as desired. At 72, the mold 30 with paste is then passed through a first pair of rollers 42. The spacing of the rollers in roller pair 42 is such that the paste is spread around on the mold to roughly approximate the desired height H1 for the resulting construction board 10. This action may result in some of the paste spilling over the edges of the mold. Once the mold 30 has passed through the first pair of rollers 42, at 74 another sheet of fiberglass is unrolled and placed on the exposed surface of the paste in the mold. Further, another sheet of polyester paper is unrolled onto the fiberglass sheet.

Figure 6:
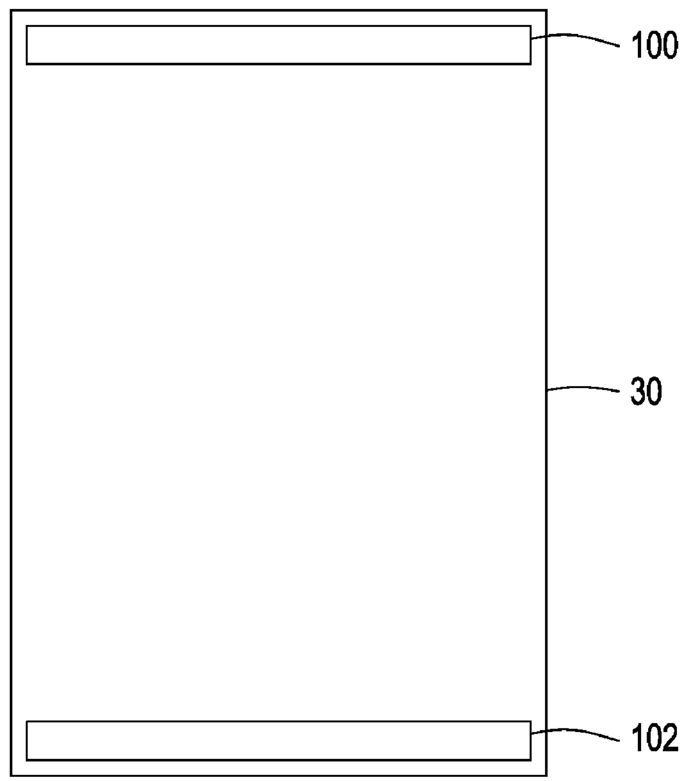
FIG. 6 illustrates an interim step during the fabrication of the construction board in which plastic strips are laid on opposite ends of the board.

At 76, a pair of plastic strips are placed on opposite ends of the mold on top of the paste as shown in FIG. 6. FIG. 6 shows a top view of the mold 30 with paste therein. A pair of plastic strips 100 and 102 are placed on the paste in the mold at opposite ends of the mold as shown. The plastic strips 100 and 102 generally run the width of the mold and function to maintain the end edges of the paste generally even prior to passing the mold through a second set of rollers. Referring again to FIG. 5, the mold 30 is then passed through a second set of rollers 44 (78). Rollers 44 preferably are spaced closer together than rollers 42 and are spaced apart at a distance that is equal to, or approximately equal to, the desired thickness H1 of the resulting construction board 10. After the mold is passed through the second pair of rollers 44, the paste in the mold has a thickness that is at least approximately the desired thickness of the construction board. The plastic strips 100 and 102 can then be removed.

Both pairs of rollers 42 and 44 are preferably constantly moisturized to minimize or prevent the composition from sticking to the rollers. For example, water can be sprayed on the rollers for this purpose.

The paste is permitted to dry and settle to initially cure the board at 80. The board is dried preferably for approximately 8 hours, although this time can be varied depending on the ambient temperature and humidity. At 82, the board is removed from the mold. At 84, the board is bathed in water (e.g., a concrete tank) for approximately 8 to 12 hours depending on the thickness of the board. Thicker boards are bathed for a longer period of time than thinner boards. The bathing process is a post-curing “cooling” down process that also allows the materials in the composition to further bond and for impurities in the board to be removed. After the bath, the board is further dried (86). This final drying action can be performed by placing the board outside in preferably sunny weather for approximately 2 to 3 days. This final drying step serves to cause all, or substantially all, water to evaporate from the board. Finally, the board is trim cut to the desired dimensions (88). The board scraps removed during the trimming process can be ground to a powder form and used as one of the constituent ingredients as noted above.

Figure 7:
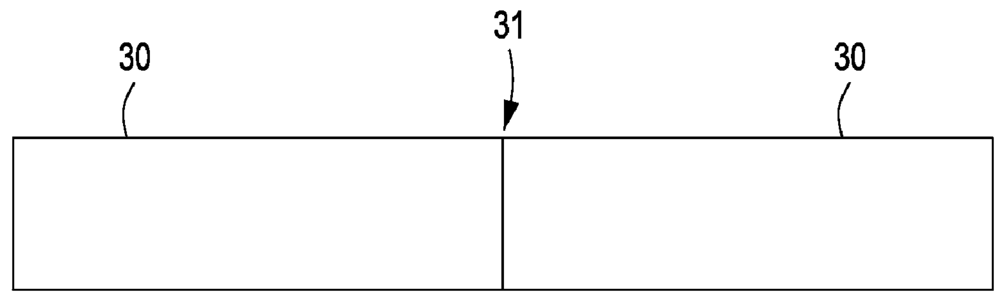
FIG. 7 illustrates two molds placed end-to-end to fabricate multiple boards simultaneously.

If desired, multiple boards may be fabricated on table 40 generally simultaneously. To fabricate multiple boards concurrently, multiple molds are used and placed end-to-end as illustrated in FIG. 7. Then, method 60 of FIG. 5 can be performed by pouring the composition across both molds in act 68. After placing the fiberglass and polypropylene sheets on the exposed paste across both molds, the paste is cut along seam 31 to separate the two molds. Then, actions 76-88 can be performed on each separate mold albeit generally simultaneously.

Figure 8:
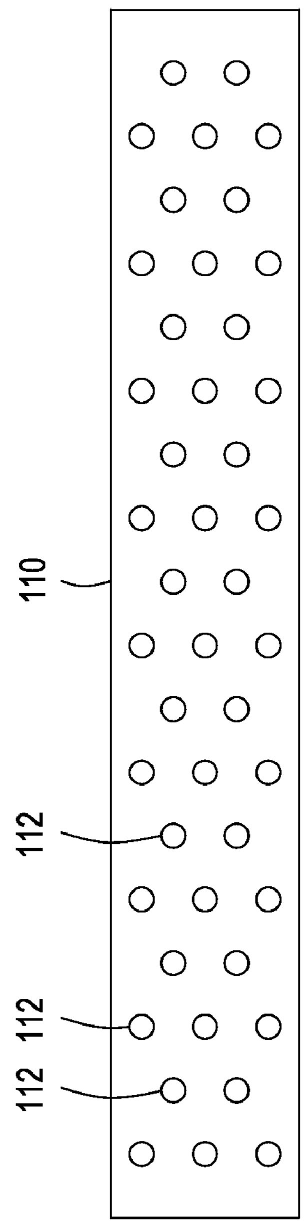
FIG. 8 shows a preferred embodiment of the construction board fabricated to be used as fascia board.

As noted above, multiple uses are possible for the construction board made from the composition described herein. By way of example, FIG. 8 shows a board 110 formed into a board suitable for use as a soffit board on a house. Holes 112 are drilled into the board 110 for airflow. A suitable texture material can be applied to the board to make the board aesthetically suitable as ceiling tile and the like.

The construction board 10 of the preferred embodiment can be cut with any conventional saw suitable for cutting wood and can be nailed in place using wood nails.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A manufactured board, comprising:

magnesium oxide;

magnesium chloride; and a filler or binding agent comprising a carbonate material, wherein the manufactured board is substantially free of silicates.

2. The manufactured board of claim 1, wherein the filler or binding agent comprises a sodium carbonate material.

3. The manufactured board of claim 1, further comprising a fiberglass sheet positioned substantially across an interior plane of the board.

4. The manufactured board of claim 2, wherein the sodium carbonate material comes from natron.

5. The manufactured board of claim 1, wherein the filler or binding agent further comprises sulfur.

6. The manufactured board of claim 1, wherein the magnesium chloride comprises approximately 2.4% by weight of sulfur.

7. The manufactured board of claim 1, wherein the manufactured board comprises an interior wall board, structural sheathing, soffit board, exterior siding, fascia board, tile backer board, decking board, radiant barrier sheathing, structural wrap, stucco wrap, window wrap, ceiling tile, or billboard backer.

8. The manufactured board of claim 1, further comprising at least one layer of reinforcing mesh extending substantially across an interior plane of the board.

9. A fabricated construction board, comprising:

magnesium oxide;

magnesium chloride;

a binding agent comprising filtered wood shavings; and at least one filler material comprising ground up board material, wherein at least one of the magnesium oxide, the magnesium chloride, the binding agent, and the filler material comprises a carbonate material, and wherein the fabricated construction board is substantially free of silicates.

10. The fabricated construction board of claim 9, further comprising at least one sheet of reinforcing mesh positioned to extend substantially across an interior plane of the board.

* * * * *